March 31, 1942. C. E. MERTZANOFF ET AL 2,277,710
SYSTEM FOR PRODUCING SHOES AND ANALOGOUS ARTICLES
Filed Nov. 19, 1938 5 Sheets-Sheet 4
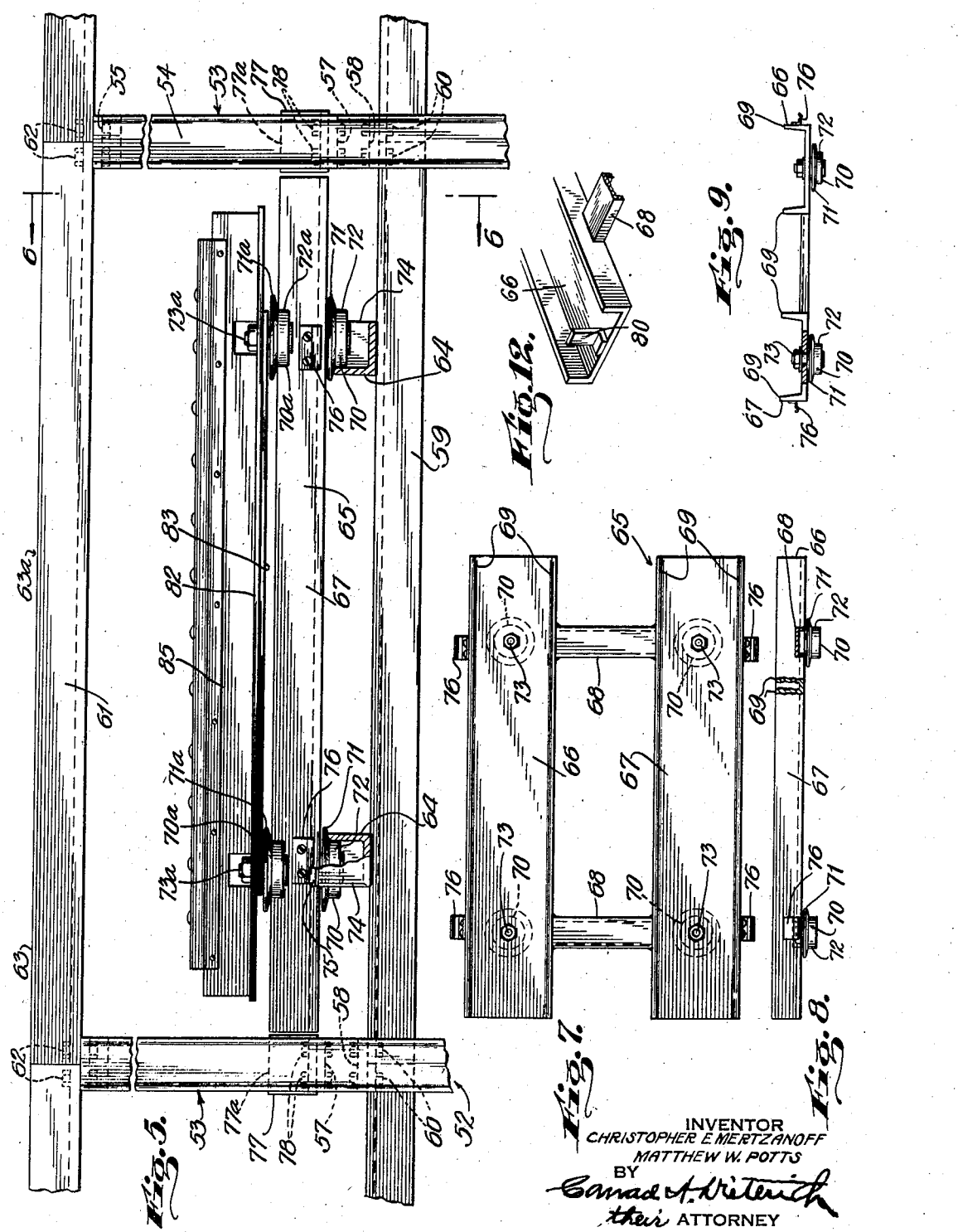
INVENTOR
CHRISTOPHER E MERTZANOFF
MATTHEW W. POTTS
BY
their ATTORNEY

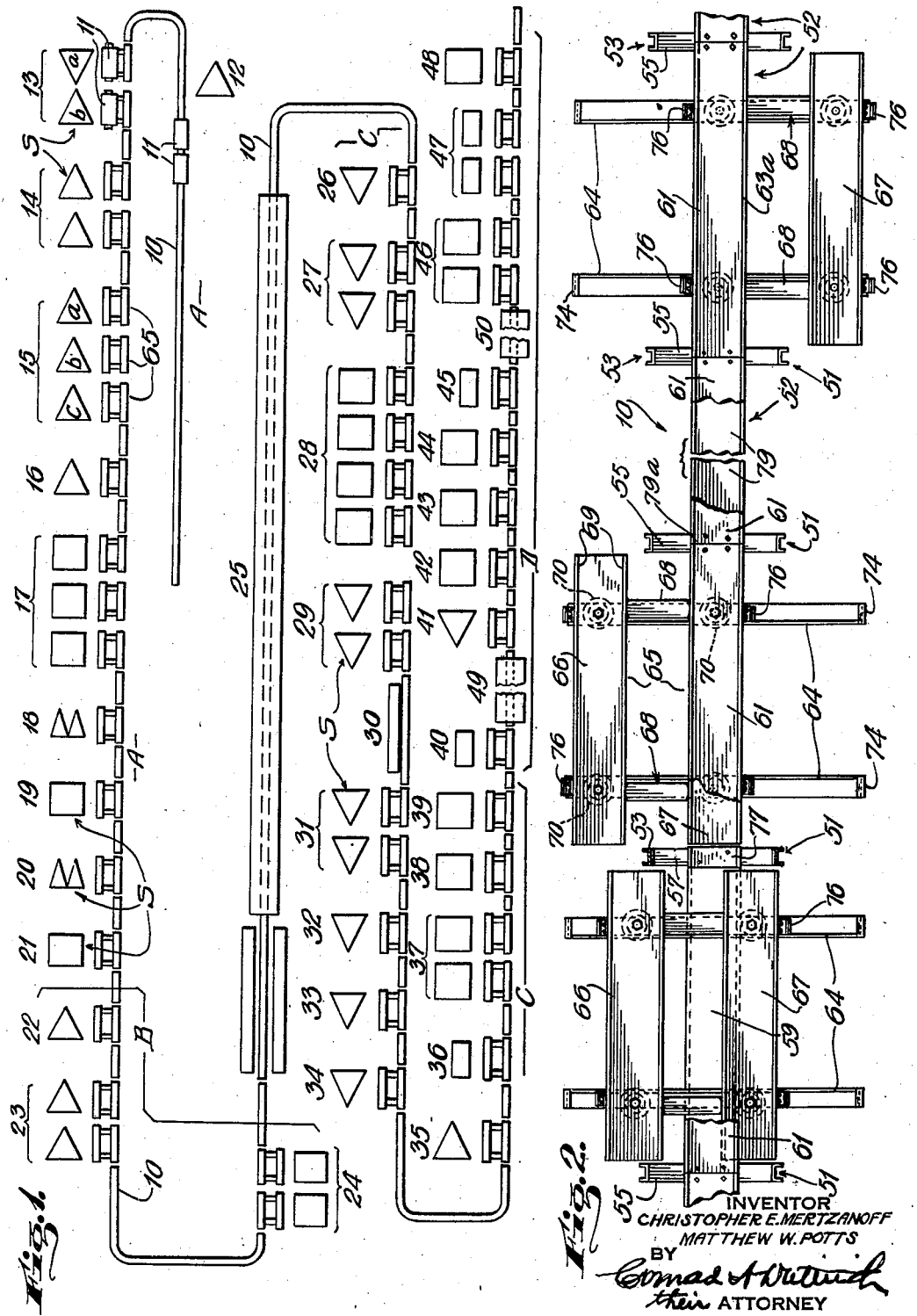

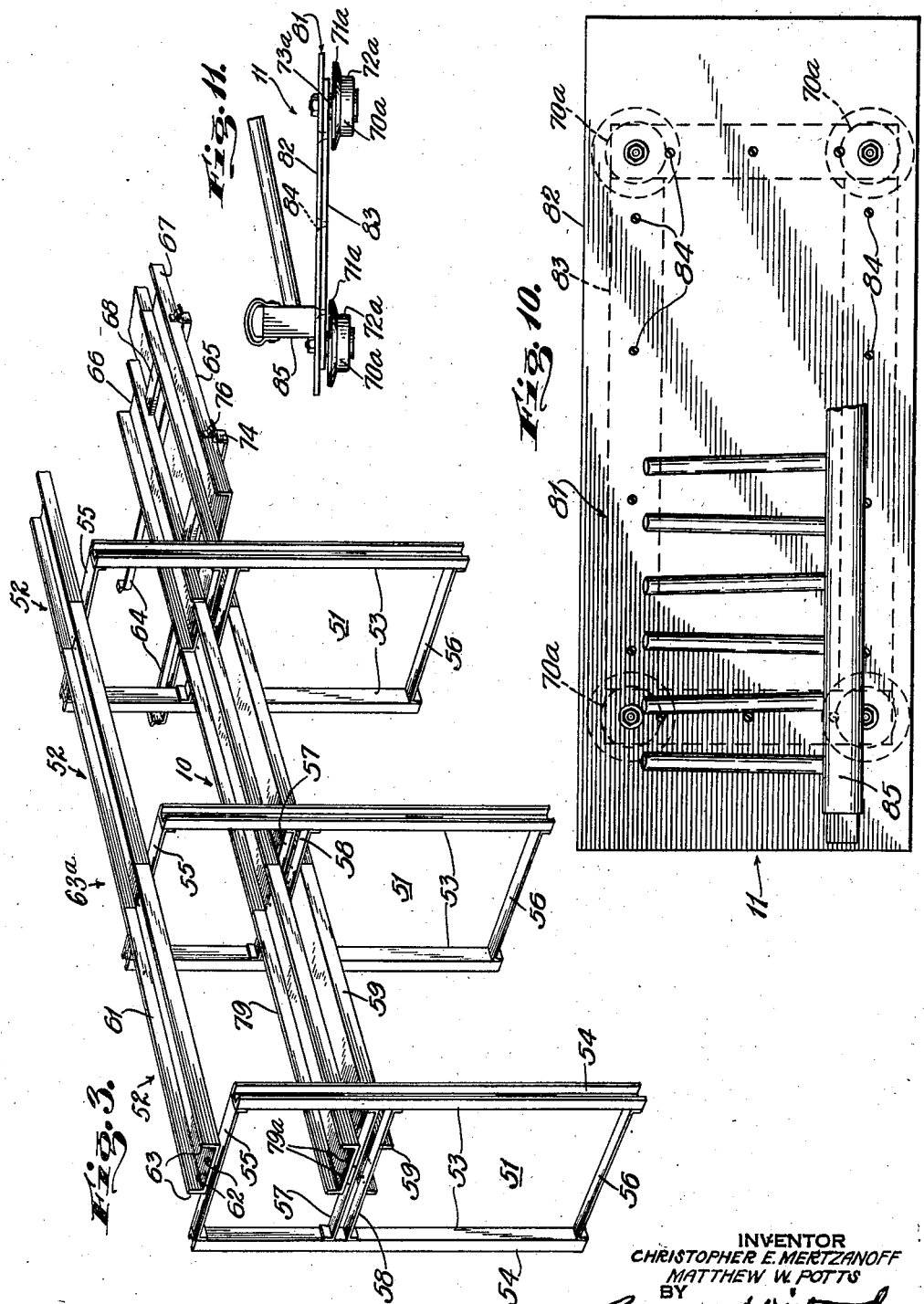

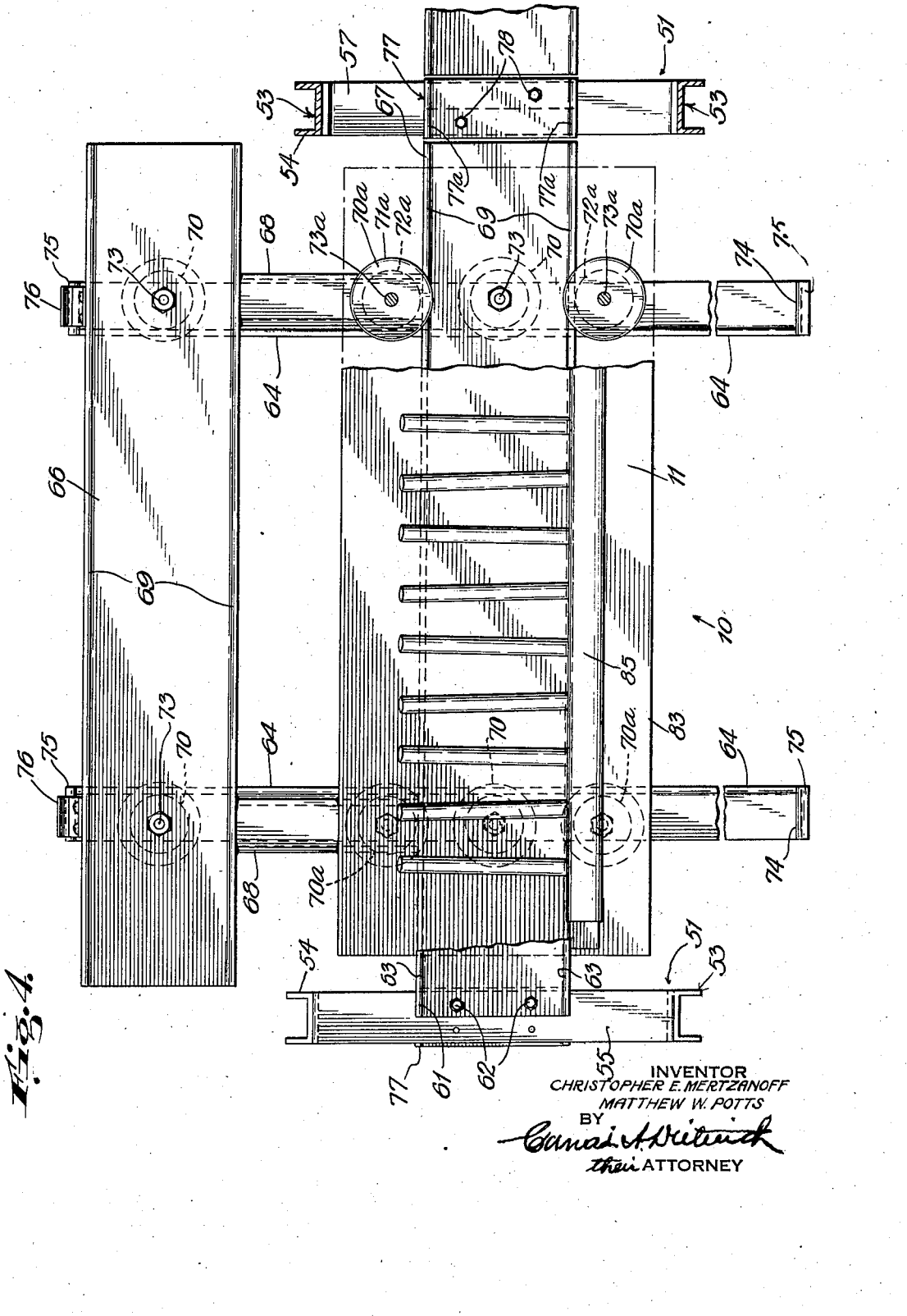

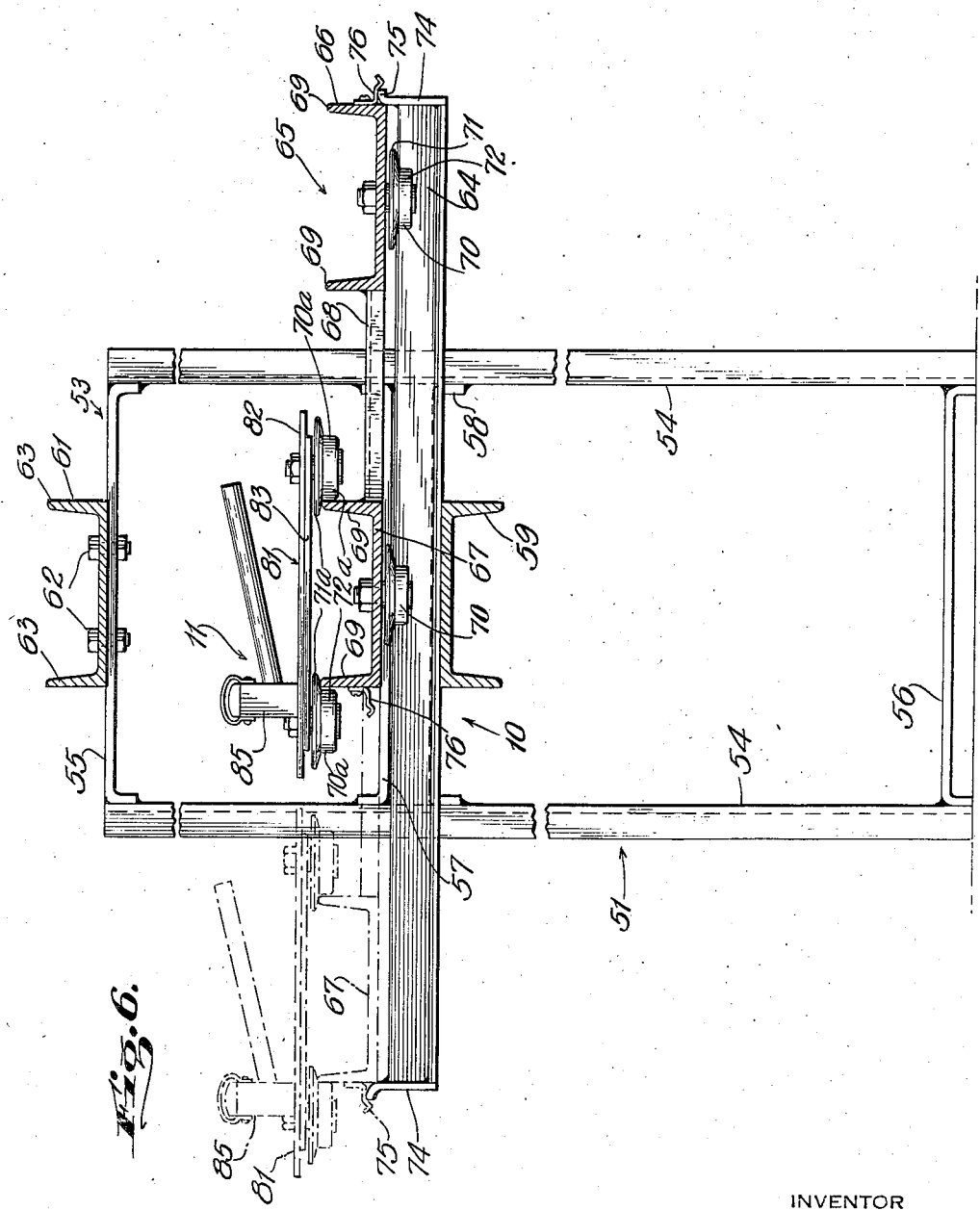

Patented Mar. 31, 1942

2,277,710

UNITED STATES PATENT OFFICE 2,277,710

SYSTEM FOR PRODUCING SHOES AND ANALOGOUS ARTICLES

Christopher E. Mertzanoff, New York, and
Matthew W. Potts, New Rochelle, N. Y.

Application November 19, 1938, Serial No. 241,366

14 Claims. (Cl. 104—48)

Our invention relates to improvements in systems for making shoes and analogous articles, and the same has for its object to provide a simple, efficient and reliable system which comprises operating stations arranged successively in the order that the operations are to be performed, and means for conveying or transporting the parts or assemblies from station to station through the system to be operated upon at the several successive stations in turn.

Further, said invention has for its object to provide a system of the character specified in which the successive stations are coordinated with each other to operate continuously at substantially the same output rates so that the work may be advanced or progressed from station to station through the system without interruption or delay.

Further, said invention has for its object to provide a system which comprises single-operator stations and multiple-operator stations, according to the character of the operations to be performed, each of the multiple-operator stations having the sub-divisions thereof arranged in series with each other and with the other stations of the system.

Further, said invention has for its object to provide a system in which the conveying or guiding means is such that work may be conveyed to and from any sub-division of a multiple-operator station, and advanced to the next succeeding station without interfering with the movements of work to and from another sub-division of the same station.

Further, said invention has for its object to provide a system in which the work supporting carriages are successively advanced, under control of the operators at the various stations, through the system over a single line of track.

Further, said invention has for its object to provide a system in which the work conveying means includes a plurality of carriages or pallets serving to support the parts or assemblies in batches or lots, and in which said carriages are successively advanced through the system so that each batch or lot of parts or assemblies may be operated upon at an anterior station before being advanced to the next station.

Further, said invention has for its object to provide a system in which the line or track includes means at various stations for withdrawing the carriages from the line of travel.

Further, said invention has for its object to provide a system in which said track or line includes means for allowing the withdrawal of a carriage from the line of travel for delivery to a given station or sub-division of a station without breaking the continuity of the track and interrupting the movement of carriages thereover to other stations or sub-divisions of stations.

Further, said invention has for its object to provide a system in which the track, at certain of the stations or sub-divisions of the stations, includes transversely-movable track sections serving as transfer cars for supporting the carriages to be withdrawn or side-tracked at a station or a sub-division of a station.

Further, said invention has for its object to provide a system in which said transversely movable member or transfer car includes parallel track sections one of which is adapted to align with the main run or track when the other is withdrawn from such alignment.

Further, said invention has for its object to provide a system in which at single operator stations means are provided which are rendered operative, as the transversely-movable member or transfer car is withdrawn, to prevent the inadvertent movement or advance of the carriages towards the next succeeding station.

Further, said invention has for its object to provide a system in which the carriages are supported or guided upon a track of relatively narrow gauge for travel thereover without binding and without danger of being upset.

Further, said invention has for its object to provide a system in which each of said carriages is mounted upon wheels disposed horizontally for rotation about vertical axes so that the center of gravity of the carriage, as thus supported on the track, is low and the work is at an elevation to be conveniently handled.

Further, said invention has for its object to provide a system in which the carriage wheels are flanged and so disposed that the load is supported upon or by the wheel flanges, and the carriage guided in its movement by the tread of the wheels.

Further, said invention has for its object to provide a system in which the transfer cars or the transversely movable track sections are supported upon wheels like those upon which the carriages or pallets are mounted.

Other objects will in part be obvious and in part be pointed out hereinafter.

To the attainment of the aforesaid objects and ends our invention consists in the novel features of construction, and in the combination, connection and arrangement of parts hereinafter more fully described and then pointed out in the claims.

In the accompanying drawings—

Figure 1 is a diagrammatic plan of one form of system constructed and arranged according to and embodying our said invention;

Fig. 2 is a plan, with parts broken away, of a portion of the carriage conveying means or track employed in the system;

Fig. 3 is a perspective of a portion thereof;

Fig. 4 is a plan on an enlarged scale of a portion of the track including a transversely movable track section or transfer car with the carriage shown disposed thereon;

Fig. 5 is a front elevation of the structure shown in Fig. 4;

Fig. 6 is a sectional view thereof on the line 6—6 of Fig. 5; the parts being shown in broken lines in carriage withdrawing position;

Fig. 7 is a plan of the transfer car or transversely movable track section;

Fig. 8 is a front elevation thereof;

Fig. 9 is an end view thereof;

Fig. 10 is a plan of one of the carriages or pallets;

Fig. 11 is an end view thereof, and

Fig. 12 is a perspective of a portion of a transfer car with a stop mounted thereon.

In accordance with our invention there is provided a succession of operating stations arranged within the factory in the order that the operations are to be performed upon the article or shoes, parts or assemblies thereof. The number of operators provided at the successive stations for accomplishing the various operations is varied in accordance with the time required for the respective operations, whether said operations are performed by hand, by machine, or in part by hand and in part by machine. The stations are designated herein for convenience as either "single-operator" stations or "multiple-operator" stations according to the number of operators at a station. The multiple-operator stations each comprises, as herein termed, two or more subdivisions in series, according to the number of operators at the particular station. Preferably, the single-operator station at which the output of work is the most rapid is taken as the unit for output, and the other stations are coordinated therewith so that the output from the successive stations is substantially the same. The number of operators required at the successive stations may be determined empirically and depends upon the nature of the operation to be performed, the capacity of the machine or machines employed for performing the operation and the skill or experience of the operator. By properly associating skilled and unskilled operators at a station the output of that station may be equalized with the outputs of the other stations so that the work may be advanced or progressed from station to station through the system without delay or interruption.

Within the scope of the present invention, the nature of the operations to be performed at the successive stations may be varied in accordance with the type or kind of shoe or other article to be produced. Further, the machines and devices employed at the various stations in the manufacture of shoes and analogous articles are well known, and particular reference thereto is deemed unnecessary to the full disclosure of the system embodying our said invention.

With the successive stations coordinated to equalize the outputs thereof, as above described, we are able to advance the parts or assemblies in small quantities, batches or lots, preferably in less than full case lots, viz: 24 pairs, upon suitable carriages or pallets over a single line or track from station to station through the system at rates precluding delay or interruption at any station, and insuring continuous operation throughout the system and continuous production. The stations and the sub-divisions of stations are arranged in series along said single line or track as hereinafter more fully described.

Referring to Fig. 1 the diagram illustrates, as one example of the application of the invention, a layout for a shoe factory in which the series or succession of operating stations, indicated generally at S, are arranged along the single line of track 10 upon which the carriages or pallets 11, carrying the parts or assemblies to be operated upon, are conveyed or advanced from station to station through the system. In the particular layout illustrated the lasting department or division A comprises the succession of stations 12 to 21, inclusive. For example, said stations successively comprise at 12 the inner sole tacker, at 13 the assemblers, at 14 the pull-overs, at 15 the side lasters, at 16 the heel seat lasters, at 17 the bed lasters, at 18 the inner sole tack pull and upper trimmer, at 19 the pounders, at 20 the shankers and bottom fill, and at 21 the last pullers.

From the lasting division the work is then advanced through the stitching department or division B comprising stations 22 to 24. For example, such stations successively comprise at 22 the McKay stitchers, at 23 the stitchers and cementers, and at 24 the levellers.

From the stitching department B the work is passed over the track 10 through a dryer 25 particularly adapted for use in the manufacture of certain types of shoes, such as McKay sewed shoes. Mechanically operated means may be employed for moving the carriages 11 through the dryer 25, if so desired. The work is next advanced through the heeling department or division C comprising the successive stations 26 to 39, inclusive. The latter stations successively include at 26 the wood heel appliers, at 27 the heel seat nailers, at 28 the heelers, at 29 the heel breasters, at 30 the relasters, at 31 the Louis flap layer, at 32 the Louis flap trim, at 33 the breast scourer, at 34 the Louis top piecer, at 35 the heel trimmers, at 36 the heel trim grinders, at 37 the edge trimmers, at 38 the rough heel scourers, and at 39 the fine heel scourers.

The work is now progressed through the finishing department or division D comprising the successive stations 40 to 48, inclusive. For example, the station 40 is for the edge and heel inkers. From station 40 the shoes are then passed through the dryer 49. The successive stations include at 41 the heel padders, at 42 the edge setters, at 43 the bottom scourers, at 44 the Naumke machine, and at 45 the bottom painters. The shoes are then passed through another dryer 50. In advance of the dryer 50 the stations include at 46 the bottom finishing brushes, at 47 the hand polishers, and at 48 the slip lasts.

In the system embodying our invention the successive stations S are arranged in series along the track 10. Stations, such as 12, 16, 18, 19, 20, 21, etc., are termed herein as single-operator stations, and stations, such as 13, 14, 15, 17, etc., are termed herein as multiple-operator stations. For example, in the diagram station 13 is illustrated as comprising two sub-divisions a and b, arranged along the track 10 in series with each other. Station 15, on the other hand, is illustrated as comprising three sub-divisions $a$, $b$ and $c$ arranged along the track 10 in series with each other and with the other stations of the system. In our system the work is conveyed upon the carriages or pallets 11 from station 12 through the successive stations S to be operated upon at each station in turn. The present invention includes means as hereinafter described, for delivering a carriage 11 to any sub-division $a$, $b$ or $c$ of a multiple-operator station, and then advancing the same to the next succeeding station without interfering with the movements of the carriages to and from another sub-division of the same station.

Referring to Figs. 2 to 12, the track 10 is supported upon frame structure 51 built up of successive sections 52 connected together and adapted to rest upon the factory floor. Each of the successive sections 52 comprises a pair of vertical frame members 53 disposed transversely at the ends thereof, each frame member including the vertical standards or stanchions 54, preferably of channel cross-section, the cross-pieces or portions 55 and 56 connecting the standards at the upper and lower ends thereof and the vertically spaced cross-pieces or portions 57 and 58 connecting the standards at intermediate points thereof. The longitudinally spaced frame members 53 of each section 52 are connected together or bridged by a longitudinally extending member 59, also preferably of channel cross-section, engaged at the ends of the intermediate portion thereof with portions of the lower sides of the cross-pieces 58 and secured thereto by bolts 60, the flanges of said channel member 59 being directed downwardly, and the intermediate portion thereof engaged with said portions 58 serving as a support for a purpose hereinafter described. The frame members 53 at the upper ends thereof are also connected together or spanned by a longitudinally extending track section or member 61 of channel cross-section having the intermediate portion thereof at the ends seated upon portions of the cross-pieces 55 and secured thereto by bolts 62. The upwardly directed flanges 63 of the member 61 form the rails of the track section, the successive sections 61 when secured in place in abutting relation at the contiguous ends forming an upper track or run 63ª, supplementary to the track 10, extending from station to station through the system for conveying carriages 11 thereover, as desired, for special purposes. As shown, the successive members 59 are likewise secured in place in abutting relation at the ends thereof to form a continuous structure, the members 59 and 61 at the contiguous ends thereof being supported upon a common frame member 53. The members 59 and 61 serve to brace the vertical members 53 longitudinally to retain the same in vertical position and to form a rigid supporting structure 51.

Certain of the members 59 form supports for the transversely extending angle members 64 serving as rails or tracks for supporting the transversely movable transfer cars or track sections 65 located at certain of the stations S, said rails 64 being preferably welded centrally thereof to the member 59 and projecting at opposite ends beyond the same. The transfer car 65 comprises two longitudinal parallel channel members 66 and 67 rigidly secured together in spaced relation by the transverse channel members 68 welded at the ends thereof to the contiguous sides of the channel members 66 and 67 to form a rigid unitary structure. The upwardly directed flanges 69 of the members 66 and 67 serve as the rail or track sections of the main run or track 10.

The transfer car 65 is mounted upon wheels 70 each having the usual flange 71 and tread 72. The wheels 70, four in number, are fastened however to the transfer car 65 at the lower side thereof for rotation in horizontal planes about vertical axes 73 at positions corresponding to the gauge of the rails or track 64 to ride thereon, the load being carried on the flanges 71 of the wheels 70 instead of the regular wheel tread, and the treads 72 serving in the present instance merely to guide the transfer car in its movement back and forth as hereinafter more fully described. With the wheels disposed horizontally as above described the elevation of the car 65 above the track is kept low and the danger of the car upsetting or jumping the track is minimized.

Movement of the car 65 beyond the rails 64, at both sides, such as to cause disengagement of the same from the rails, is prevented by the end members or stops 74 welded or otherwise secured to the ends of the rails 54 at both sides and extending upwardly into the path of travel of the car 65 in either direction. The stop members 74 are preferably provided at the upper ends thereof with outwardly directed flange portions 75 serving as catches adapted to be engaged by the spring members 76 secured to the opposite sides of the transfer cars 65 in position to hook over the edges of the catches 75 and lock the car against movement effectively in either its normal position or its withdrawn position.

The track sections 67 normally constitute portions of the main run or track 10. When two or more of said transversely movable track sections 67 are in immediate alignment, the gap or gaps between the contiguous ends of such sections are preferably completed or filled in by a relatively narrow stationary track section 77 of corresponding gauge secured by bolts 78 upon the cross-piece 57 and provided with flanges 79 adapted to align with the flanges 69 of the track sections 67 located at opposite sides thereof to form a continuous track. When the transfer car 65 is withdrawn, the other track section 66 thereof moves into alignment with the narrow track section 77 to maintain the main run of track uninterrupted at the particular point.

When a particular section 52 of the frame structure 51 does not require a transfer car 65, a fixed track section 79 of the same gauge, similar to the track section 61, is secured at its ends by bolts 79ª to the cross-pieces 57 of the contiguous pair of frame members 53 in position spanning said members 53 so as to align with the track sections at the opposite ends thereof, whether fixed or transversely movable.

The main run or track 10 therefore comprises a succession of sections consisting normally of combinations of the movable sections 67, sections 77 and sections 79 in alignment with each other and with the contiguous ends thereof in abutting relation to form a continuous track over which the carriages or pallets 11 may be conveyed. When a transfer car 65 is withdrawn at any station to side-track the carriage 11 carried thereby, the track section 66 moves into aligment with the other sections of the track 10 to maintain the continuity thereof.

In some instances, at single-operator stations, the transfer car 65 is provided at the anterior end of track section 66, as shown at Fig. 12, with a stop 80 which, when the car at such station is withdrawn, moves into alignment with the track 10 at the anterior end of the transfer car to prevent inadvertent movement of carriages toward the next succeeding station. When convenient, the portion of the track 10 passing certain of the single-operator stations may consist of a fixed track section 79 upon which the carriage 11 remains without being withdrawn while the work carried thereby is being operated upon at that station.

The carriages or pallets 11 adapted to be conveyed over the track 10 and the upper track 63ª each has a platform or support 81 comprising a wooden top piece 82 reinforced at the bottom thereof by a metallic frame 83 secured to the top piece 82 by screws 84. The platform 81 is mounted upon wheels 70ª, like the wheels 70 of the transfer car 65, each having the usual flange 71ª and tread 72ª. The wheels 70ª are fastened to the platform 81 at the lower side thereof for rotation in horizontal planes about vertical axes 73ª. The wheels 70ª, preferably comprising four in number, are fastened to the platform 81 at points corresponding to the gauge of the track 10 to ride thereover, the load being carried on the flanges 71ª of the wheels instead of the regular wheel tread, and the treads 72ª serving to guide the carriage 11 on the rail flanges of the track 10. A rack 85 is secured upon the platform 81 for supporting the shoes or work to be operated upon. By mounting the carriages or pallets 11 upon wheels 70ª disposed horizontally as above described the elevation of the carriage above the track 10 is kept relatively low so that the support 81 may project at opposite sides beyond the track 10, which is of relatively narrow gauge, to provide the necessary space upon the support 81 for the desired quantity of work while minimizing the danger of the carriages upsetting or jumping the track during the travel of the carriages thereover. By mounting both the transfer cars 65 and carriages 11 upon horizontally disposed wheels 70 and 70ª the height thereof above the floor is reduced and the work is placed at an elevation more conveniently available to the operators at the various stations.

Further, with the wheels disposed as above described the carriages may be more readily guided along the track 10 without binding, and particularly over curves when the radii thereof are properly designed.

In operation of the system, the uppers and other parts to be operated upon and the shoe lasts are located conveniently to the first station 12 for the operation to be performed. The work is then place upon carriages 11 to be advanced or pushed by hand over the track 10 to the next station 13 which comprises two sub-divisions a and b. Upon arrival of a carriage 11 at sub-division a the carriage rests upon a transfer car 65 with the wheels 70ª of the carriage engaged with the track section 66 thereof. The operator at sub-division a then withdraws the carriage 11 from its path of travel by pulling the transfer car 65 transversely and disengaging the locking means 75—76 at one side thereof. The car 65 moves upon the rails 64 to cause the other track section 67 thereof to move into alignment with the main run of track 10, the transfer car then becoming locked against movement by engagement of the catch portions 75—76 at the opposite side of the transfer car 65 in position side tracking the carriage 11 carried by the transfer car. The next carriage 11 is then moved past subdivsion a into position upon the transfer car 65 associated with sub-division b to be withdrawn in like manner without interrupting the continuity of the track at this station. Should the operator at sub-division a complete his work before the operator at sub-division b he pushes his transfer car 65 into normal position and then advances the carriage 11 over the track section 67 which is then in aligned position with the main run 10 at sub-division b, for delivery to the next succeeding station 14 or to one of the sub-divisions a or b thereof. The operator at sub-division a of station 13 can then receive and withdraw another carriage before the work is completed at sub-division b of said station. Should the operator at sub-division b of station 13 complete his work first he can return his transfer car 65 to normal position and advance the carriage 11 carried thereby into position at station 14 to be operated upon. The operator at sub-division b can then receive and withdraw another carriage advanced past sub-division a before the work is completed at sub-division a, if so desired. At single-operator stations the carriages may be withdrawn from the main track or remain thereon as found desirable. In some instances, when it is desirable to withdraw a carriage at a single-operator station the stop means 80 is provided to prevent the advance of other carriages past said single-operator station towards the next succeeding station before the work is completed at said single-operator station. In like manner each carriage 11, as the work thereon is completed at an anterior station, or a sub-division thereof, is advanced to the next succeeding station or to a sub-division thereof throughout the entire system.

In our invention we control or proportion the factors determining the work output rates of the successive stations to equalize said work output rates throughout the system so that the work may be advanced through the system from a single-operator station to a multiple-operator station, or vice versa, over a single line of track in predetermined quantities or batches without interruption or delay at any station to insure continuous production.

Further, we are able by our invention to deliver work to one sub-division of a station and advance the same to the next succeeding station without interfering with the movements of work to and from another sub-division of the same station and to the next succeeding station.

In our invention, we provide a simple construction of runway or track over which carriages are designed to travel with ease and dispatch, the advance thereof being under the control of the successive operators so that completion of the work carried by each carriage at one station is insured before the carriage is advanced to the next succeeding station.

While we have illustrated as one example of the application of the invention one continuous track traversing the several divisions or departments, such as departments A, B, C and D of a shoe factory, it is to be understood that such track or runway may be interrupted, if necessary, between successive departments or divisions, and the work transferred from one department to the next by other means, such as transfer cars, dwelling stations, turntables, elevators or the like.

Having thus described our said invention what we claim and desire to secure by Letters Patent is:

1. A system of the character described comprising a production line including a series of operator stations arranged successively in accordance with the operations to be performed, and a trackway extending along said production line and providing a line of travel for the carriers for supporting the work to be operated upon from station to station, said trackway, at successive stations, including transversely movable carrier-supporting track sections manually operated independently of each other for withdrawing the carrier thereon at any of said stations from said line to permit of the performance of the operation upon the work and for returning the carrier to said line upon the completion of said operation and permit of the advancement of the carrier to a succeeding station; each of said successive sections having an additional track portion movable into alignment with said trackway when any of said sections is withdrawn and permit of the uninterrupted advance of the carriers from an anterior point over the additional track portion to a posterior station to be there withdrawn and returned by the transversely movable carrier supporting section of said posterior station.

2. A system of the character described comprising a production line including single operator and multiple operator stations arranged successively in accordance with the operations to be performed, said multiple operator stations being coordinated with the single operator stations to equalize the output rates thereof, and the sub-divisions of the multiple operator stations being in series with each other and with the single operator stations, and a trackway extending along said production line and providing a line of travel for the carriers for supporting in lots the work to be operated upon from station to station, said trackway, at successive stations and sub-divisions thereof, including transversely movable carrier-supporting track sections for withdrawing the carrier thereon at any of said stations or sub-divisions from said line into a dwell position to permit of the performance of the operation upon the work and for returning the carrier to said line upon the completion of said operation and permit of the advancement of the carrier to a succeeding station; each of said successive sections having an additional track portion movable into alignment with said trackway when any of said sections is withdrawn and permit of the uninterrupted advance of the carriers from an anterior point over the additional track portion to a posterior station to be there withdrawn and returned by the transversely movable carrier supporting section of said posterior station.

3. A system of the character described comprising a production line including a series of operator stations arranged successively in accordance with the operations to be performed, a support extending along said production line, transversely extending tracks upon said support at successive stations, and a longitudinal trackway upon said support providing a single line of travel for the carriers for supporting in lots the work to be operated upon from station to station, said trackway, at successive stations, including carrier-supporting track sections supported by said transverse tracks for withdrawing the carrier on said section at any of said stations from said line of travel into a dwell position upon said transverse track to permit of the performance of the operation upon the work and for returning the carrier to said line of travel upon the completion of said operation and permit of the advancement of the carrier to a succeeding station; each of said successive sections having an additional track portion movable upon said transverse track into alignment with said longitudinal trackway when any of said sections is withdrawn and permit of the uninterrupted advance of the carriers from an anterior point over the additional track portion to a posterior station to be there withdrawn and returned by the transversely movable carrier supporting section of said posterior station.

4. A system of the character described comprising a support extending along a production line including a series of operator stations arranged in successive positions, a longitudinal run of track upon said support including transversely movable members at successive stations to be manually operated independently of each other, each having parallel track portions adapted to be alternately aligned with the longitudinal run of track, one of said track portions, when a member at a given station is withdrawn from the run of track, serving as a dwell support for a carrier for supporting in lots the work to be operated upon at the station and the other of said track portions serving, when said member is withdrawn, to maintain communication thereover from an anterior point to a posterior station, and means on said support for guiding each of said members to and from withdrawn position.

5. A system of the character described comprising a support extending along a production line including a series of successively arranged operator stations, tracks extending transversely of said support at successive stations, and a longitudinal run of track upon said support including manually operated transversely movable members riding upon said transverse tracks at the successive stations and having parallel track portions adapted to align with the longitudinal run of track, each of said members serving to withdraw a carrier disposed upon one of the parallel track portions thereof into a dwell position to permit of the performance of an operation upon the work supported by the carrier and to return the carrier to the run of track upon the completion of the work, and other of said parallel track portions, in the withdrawn position of any of said members, serving to permit of the uninterrupted advance of carriers thereover to a succeeding station to be withdrawn and returned by said member at said succeeding station.

6. A system of the character described comprising a frame structure extending along the successive operator stations of a production line and including a longitudinally-extending support, a longitudinal run of track upon said frame structure above said support including transversely movable members at successive stations to be manually operated independently of each other each having parallel track portions adapted to alternately align with said longitudinal run of track, and track members on said support extending transversely thereof beyond said longitudinal run of track at opposite sides thereof for supporting and guiding said members at the successive stations.

7. A system of the character described comprising a support extending along the successive operator stations of a production line, a longitudinal run of track upon said support including transversely movable members at successive stations to be manually operated independently of each other each having parallel track portions adapted to alternately align with said run of track, parallel tracks extending transversely of said support below each of said transversely movable members for supporting and guiding the same from one position to the other, and means at the ends of each pair of said parallel tracks and upon the contiguous member adapted to engage each other for locking the member in either position.

8. A system of the character described comprising a production line including a series of operator stations, longitudinally spaced, transverse frame members extending therealong and including cross portions in vertically spaced relation, members spanning the successive frame members and secured in aligned relation to the upper cross portions to form a track, members spanning the successive frame members and secured in aligned relation to lower cross portions thereof to form a support, and a longitudinal run of track including in part fixed track sections supported upon cross portions of said frame members intermediate said upper and lower cross portions and in part transversely movable track sections at the successive stations adapted to be manually moved independently of each other out of and into alignment with the fixed track sections, and means disposed transversely upon said lower members for supporting and guiding the movable track sections.

9. A system of the character described comprising a production line including a series of operator stations, longitudinally spaced transverse frame members disposed along said production line, upwardly directed, channel members connecting the upper portions of said frame members in aligned relation to form a track, downwardly directed channel members connecting lower portions of said frame members in aligned relation to form a support, and a longitudinal run of track including fixed upwardly directed channel members mounted on said frame members and transversely movable upwardly directed channel members at said stations supported and guided upon said support to be manually moved independently of each other out of and into alignment with said last-named fixed channel members.

10. A system of the character described comprising a production line including a series of operator stations, longitudinally spaced, transverse frame members disposed along said production line and including transverse portions, members connecting said frame members and secured to the lower of said transverse portions to form a support, pairs of transversely extending track members mounted upon said support at successive operator stations, and a longitudinal run of track including transversely movable track sections guided and supported upon said transverse track members to be manually moved independently of each other to and from alignment with the longitudinal run of track, and a fixed track section secured to an upper cross portion intermediate said transversely movable track sections.

11. A system of the character described comprising a production line including a series of operator stations, a frame structure extending along the operator stations, a longitudinally extending member serving to brace said frame structure, transversely extending track portions upon said longitudinal member at the successive station, and a longitudinal run of track on said frame structure above said transverse track portions to provide a line of travel for the work supporting carriers successively from station to station, said longitudinal run of track including members movable upon said transverse track portions at the successive stations comprising parallel track portions adapted to be alternately aligned with the longitudinal run of track, and said last-named members being movable manually independently of each other for withdrawing the work supporting carriers arriving at said stations from the longitudinal run of track and returning the carriers thereto upon the completion of the operation.

12. A system of the character described comprising a production line including a series of operator stations, a supporting structure extending along said stations including transversely disposed frame members in longitudinally-spaced relation, members spanning the successive frame members and secured thereto in aligned relation in position to form an intermediate support, transversely-extending track portions upon said aligned members at the successive stations, and a longitudinal run of track on said structure above said transverse tracks to provide a line of travel for the work supporting carriers from station to station, said longitudinal run of track including members movable upon said transverse track portions at the successive stations comprising parallel track portions adapted to be alternately aligned with the longitudinal run of track, and said last-named members being movable manually independently of each other for withdrawing the carriers arriving at said stations from the run of track and returning the carrier thereto.

13. A system as defined in claim 5 in which each of said transversely-movable members is provided with flanged wheels rotatable about vertical axes with the flanges of said wheels engaging the transverse tracks for supporting the load and maintaining the center of gravity of said transversely-movable members sufficiently low to insure stability thereof.

14. A system as defined in claim 5 in which said transversely-movable members and said carriers are severally provided with flanged wheels rotatable about vertical axes with their flanges engaging their respective track portions to maintain the center of gravity of said members and carriers sufficiently low to insure stability.

CHRISTOPHER E. MERTZANOFF.
MATTHEW W. POTTS.